(12) United States Patent
Cheng et al.

(10) Patent No.: US 11,743,152 B2
(45) Date of Patent: Aug. 29, 2023

(54) METHOD AND APPARATUS FOR APPLICATION PERFORMANCE MANAGEMENT VIA A GRAPHICAL DISPLAY

(71) Applicant: ALIBABA GROUP HOLDING LIMITED, Grand Cayman (KY)

(72) Inventors: Yao Cheng, Hangzhou (CN); Jun Feng, Hangzhou (CN); Xiaofan Zhou, Hangzhou (CN); Yi Yang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 11 days.

(21) Appl. No.: 17/271,400

(22) PCT Filed: Sep. 6, 2019

(86) PCT No.: PCT/CN2019/104652
§ 371 (c)(1),
(2) Date: Feb. 25, 2021

(87) PCT Pub. No.: WO2020/052496
PCT Pub. Date: Mar. 19, 2020

(65) Prior Publication Data
US 2021/0306238 A1    Sep. 30, 2021

(30) Foreign Application Priority Data
Sep. 14, 2018  (CN) .......................... 201811071723.5

(51) Int. Cl.
*H04L 43/045*   (2022.01)
*G06F 9/455*    (2018.01)
(Continued)

(52) U.S. Cl.
CPC ........ *H04L 43/045* (2013.01); *G06F 9/45533* (2013.01); *G06F 11/0709* (2013.01); *H04L 43/028* (2013.01); *H04L 43/50* (2013.01)

(58) Field of Classification Search
CPC ..... H04L 43/045; H04L 43/028; H04L 43/50; G06F 9/45533; G06F 11/0709; G06F 11/328; G06F 9/451
See application file for complete search history.

(56) References Cited

U.S. PATENT DOCUMENTS

| 5,491,791 A | 2/1996 | Glowny et al. |
| 6,085,244 A | 7/2000 | Wookey |

(Continued)

FOREIGN PATENT DOCUMENTS

| CN | 102509350 A | 6/2012 |
| CN | 103873277 A | 6/2014 |

(Continued)

OTHER PUBLICATIONS

International Search Report to corresponding International Application No. PCT/CN2019/104652 dated Nov. 27, 2019 (1 page).

(Continued)

*Primary Examiner* — John A Follansbee
*Assistant Examiner* — Fadi Haj Said
(74) *Attorney, Agent, or Firm* — James J. DeCarlo; Greenberg Traurig, LLP

(57) ABSTRACT

A displaying method and apparatus for application performance management are disclosed. The method includes obtaining data from a target application; mapping the data into a plurality of dimensions; displaying a plurality of layers corresponding to the plurality of dimensions; and displaying, based on a dimension associated with an object (Continued)

supported by the target application, a visualized node corresponding to the object at a corresponding layer of the plurality of layers.

17 Claims, 10 Drawing Sheets

(51) Int. Cl.
*G06F 11/07* (2006.01)
*H04L 43/028* (2022.01)
*H04L 43/50* (2022.01)

(56) References Cited

U.S. PATENT DOCUMENTS

| | | | |
|---|---|---|---|
| 6,801,940 | B1 | 10/2004 | Moran et al. |
| 8,239,538 | B2 | 8/2012 | Zhang et al. |
| 8,627,426 | B2 | 1/2014 | Lucovsky et al. |
| 8,949,826 | B2 | 2/2015 | Fitzgerald et al. |
| 9,110,727 | B2 | 8/2015 | Brock et al. |
| 9,654,361 | B2 | 5/2017 | Vasseur et al. |
| 10,111,126 | B2 | 10/2018 | Toskala et al. |
| 10,659,387 | B2 | 5/2020 | Udupi et al. |
| 10,756,990 | B1 * | 8/2020 | Chakkassery Vidyadharan .......... G06F 11/301 |
| 2008/0126856 | A1 | 5/2008 | Levidow et al. |
| 2009/0199178 | A1 | 8/2009 | Keller et al. |
| 2010/0211829 | A1 | 8/2010 | Ziskind et al. |
| 2011/0206053 | A1 * | 8/2011 | Henry ............ H04L 45/04 370/400 |
| 2012/0072887 | A1 * | 3/2012 | Basak ............ G06F 11/323 717/123 |
| 2012/0127882 | A1 * | 5/2012 | Edwards ............ H04L 47/2416 370/252 |
| 2014/0365647 | A1 * | 12/2014 | Haraszti ............ H04L 41/12 709/224 |
| 2015/0039382 | A1 | 2/2015 | Kim |
| 2015/0154270 | A1 | 6/2015 | Marinoiu et al. |
| 2016/0292895 | A1 | 10/2016 | Billi et al. |
| 2017/0109933 | A1 | 4/2017 | Voorhees et al. |

FOREIGN PATENT DOCUMENTS

| | | |
|---|---|---|
| CN | 106020138 A | 10/2016 |
| CN | 107294764 A | 10/2017 |

OTHER PUBLICATIONS

European Extended Search Report to corresponding EP Application No. 19860411.8 dated Aug. 4, 2022, 13 pages (2022).

\* cited by examiner

METHOD AND APPARATUS FOR APPLICATION PERFORMANCE MANAGEMENT VIA A GRAPHICAL DISPLAY

CROSS-REFERENCE TO RELATED APPLICATIONS

The present application is a national stage entry of Int'l Appl. No. PCT/CN2019/104652, filed on Sep. 6, 2019, which claims priority to Chinese Patent Application No. 201811071723.5 filed on Sep. 14, 2018, both of which are incorporated herein by reference in their entirety.

BACKGROUND

Technical Field

The disclosure relates to the field of computer technologies, and in particular, to a method and apparatus for application performance management via a graphical display.

Description of the Related Art

With the rapid development of cloud computing technologies, an increasing number of applications are deployed in the cloud. To ensure the reliable operation of the applications in the cloud, technologies are used to provide data visualization. For example, a display of various data with respect to the operation of an application in the cloud can be visually displayed by graphics to allow users to intuitively comprehend various parameters or status information with respect to the operation of the application. However, current data visualization techniques are typically only suitable for displaying characteristics of data in a single dimension to provide intuitive and in-depth observation and analysis of the data.

SUMMARY

Embodiments of the disclosure provide displaying methods and apparatuses for application performance management.

In one embodiment, the disclosure provides a displaying method for application performance management, the method comprising: displaying a plurality of layers corresponding to a plurality of dimensions; and displaying, based on a dimension associated with an object supported by a target application, a visualized node corresponding to the object at a corresponding layer of the plurality of layers.

In one embodiment, the disclosure provides a displaying apparatus for application performance management, the apparatus comprising: a layer displaying unit configured for displaying a plurality of layers corresponding to a plurality of dimensions; and a mark displaying unit configured for displaying, based on a dimension associated with an object supported by a target application, a visualized node corresponding to the object at a corresponding layer of the plurality of layers.

DETAILED DESCRIPTION OF EMBODIMENTS

Exemplary embodiments are described in detail herein with references to the drawings. In describing the drawings, the same numbers in different drawings represent the same or similar elements unless otherwise indicated. The implementations described in the following exemplary embodiments do not represent all implementations consistent with the embodiments of the disclosure. Instead, they are merely examples of apparatuses and methods that are described in detail in the appended claims, consistent with some aspects of embodiments of the disclosure.

It should be noted that in some embodiments, steps of the corresponding method are not necessarily performed in the order shown and described in the disclosure. In some embodiments, the method can include more or fewer steps than those described in the disclosure. Further, a single step described in the disclosure may be divided into a plurality of steps for description in some embodiments; and a plurality of steps described in the disclosure may also be combined into a single step for description in some embodiments.

In some embodiments, the displaying scheme of the disclosure is applied to an electronic device. By way of non-limiting examples, the electronic device includes a PC, a tablet device, a laptop computer, a PDA (Personal Digital Assistant), a mobile phone, a wearable device (e.g., smart glasses, a smartwatch, etc.), and the like. During operation, the electronic device executes a data visualization displaying system to cause the displaying of data visualization, thereby accomplishing the displaying scheme of the disclosure. In one example, an application program of the displaying system is pre-installed on the electronic device such that the displaying system is launched and executed on the electronic device. In another example, with technology such as HTML5, there is no need to install a corresponding application program on the electronic device to obtain and run the displaying system.

Figure 1:
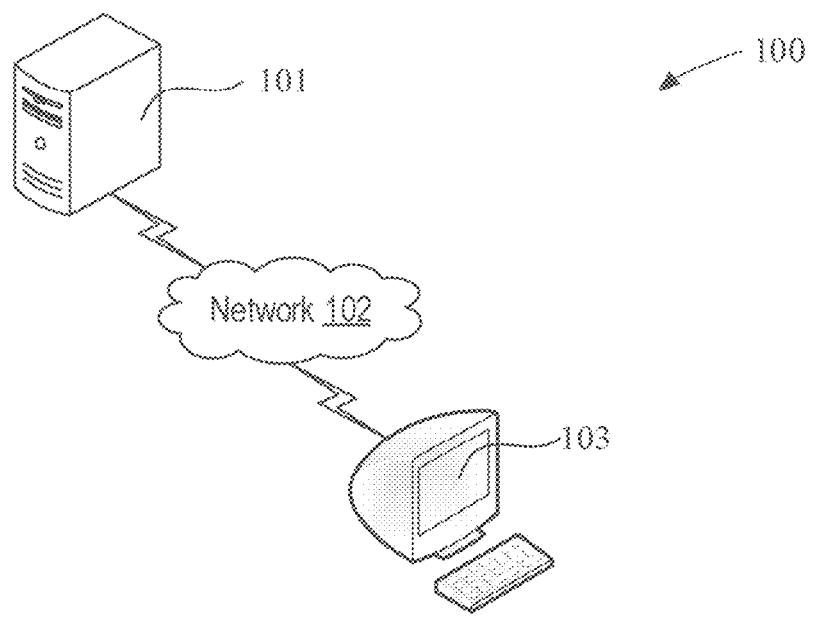
FIG. 1 is a block diagram illustrating a displaying system according to some embodiments of the disclosure.

FIG. 1 is a block diagram illustrating a display system for data visualization according to some embodiments of the disclosure. In this illustrated embodiment, the data visualization displaying system (100) includes a server (101), a network (102), and an electronic device (103). In some embodiments, the server (101) runs a server-side program of the displaying system during the operation to implement the related functionalities such as data processing. The electronic device (103) runs a client-side program of the displaying system during the operation to implement the related functionalities such as displaying, human-computer interaction, and so on. This way, the server (101) and the electronic device (103) cooperate in implementing the data visualization displaying scheme.

In some embodiments, the server (101) includes a physical server comprising an independent host. In some embodiments, the server (101) includes a virtual server hosted by a cluster of servers. In some embodiments, the electronic device (103) includes any one of a PC, a tablet device, a laptop computer, a PDA, a mobile phone, a wearable device (e.g., smart glasses, a smartwatch, etc.), and the like, without limitation. In some embodiments, the network (102) for communication between the electronic device (103) and the server (101) includes a plurality of types of wired or wireless networks. In one embodiment, the network (102) includes a public switched telephone network (PSTN) and the Internet. In one example, a client application program of the displaying system is pre-installed on the electronic device such that the client is launched and run on the electronic device. Alternatively, when an online "client" supported by the HTML5 technology is used, there is no need to install a corresponding application program on the electronic device to obtain and run the client.

Figure 2:
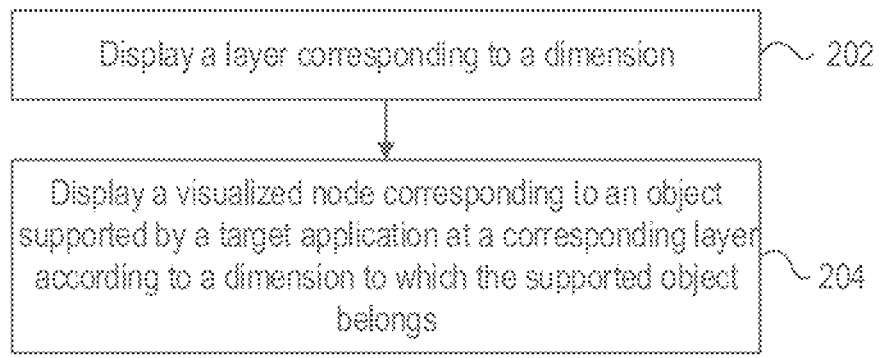
FIG. 2 is a flow diagram illustrating a displaying method for application performance management according to some embodiments of the disclosure.

FIG. 2 is a flow diagram illustrating the display method for application performance management according to some embodiments of the disclosure. In some embodiments, and as shown in FIG. 2, the method includes the following steps.

Step 202: displaying a plurality of layers corresponding to a plurality of dimensions.

In some embodiments, each layer of the plurality of layers is represented as a corresponding display plane such that different layers correspond to different display planes. In one example, the display planes correspond to different layers are displayed in stacks in sequence. In some embodiments, each layer is represented in other forms without limitation. In one example, each layer is represented in a corresponding ring structure, and the ring structures corresponding to different layers are nested in sequence.

In some embodiments, a dimension of the plurality of dimensions includes at least one dimension of a request, an action, service, an application, a process, a virtual machine, a container, a host, and so on, without limitation. In displaying data visualization for a target application, a plurality of the aforementioned dimensions is selected to implement visualized displaying of data via a plurality of corresponding layers. In some embodiments, a dependency relationship exists between the plurality of selected dimensions, and such a dependency relationship is also manifested between the objects that belong to respective dimensions and supported by the target application. For example, when the selected dimensions are a dimension of service, a dimension of application, and a dimension of a host, the service dimension depends on the application dimension, and the application dimension depends on the host dimension. When corresponding the selected dimensions to the target application, the target application includes supported objects belonging to the service dimension, the application dimension, and the host dimension, respectively. For example, a supported object belonging to the service dimension is a service 1, supported objects belonging to the application dimension are an application 1 and an application 2, and supported objects belonging to the host dimension are hosts 1 through 10. Here, in this example, service 1 is implemented depending on application 1 and application 2, application 1 is hosted by hosts 1 through 4, and application 2 is hosted by hosts 5 through 10.

Step 204: displaying a visualized node corresponding to an object supported by a target application at a corresponding layer based on a dimension to which the supported object belongs.

In some embodiments, via displaying the supported objects of the target application as visualized nodes at corresponding layers, with respect to the back-end data of the target application, relevant conditions of the target application are viewed simultaneously from a plurality of dimensions, thereby allowing a user to quickly locate or address problems or faults of the target application without or with minimal interface switching or navigation.

In some embodiments, the layer and the visualized node are displayed in a three-dimensional (e.g., 3D) form, which, compared to a two-dimensional (2D) display plane, offers more display aspects such as a height, a volume, a spatial distance, and a time period. This way, the target application is represented more comprehensively on the same interface, allowing the user to quickly grasp relevant conditions of the target application.

In some embodiments, when the displaying is performed in the aforementioned three-dimensional form, at least one of a display aspect and a scale ratio for the layer and the visualized node is adjusted based on a received adjustment instruction. For example, adjustment based on a display aspect changes the content that is viewable by the user. Each display aspect functions equivalently to providing the user with a 2D display plane, but the user can quickly switch between different display aspects to meet the viewing needs without performing an interface switching operation. For another example, adjustment based on the scale ratio allows the user to quickly switch between a global perspective and a local perspective to meet the viewing needs without performing an interface switching operation. For still another example, the display aspect and the scale ratio can be simultaneously adjusted, the details of which are not repeated herein.

In some embodiments, a selected layer is determined, and the displaying is, in turn, switched to displaying the selected layer, and the visualized node(s) included therein. In other words, among a plurality of displayed layers, the user can separately view each layer, and the visualized node(s) included therein, facilitating the viewing of the detailed content of each layer and the visualized node(s) included therein.

In some embodiments, corresponding visualized nodes are displayed in an associative manner based on a dependency relationship between the supported objects at different dimensions. For example, a virtual connecting line is displayed between two visualized nodes to show a dependency relationship between the two supported objects respectively corresponding to the two visualized nodes. Such dependency relationship can also be represented in any other suitable manner, without limitation. Further, in one example, an end arrow is used at the end of the virtual connecting line close to a supported object 1 to indicate that supported object 1 depends on a supported object 2 (e.g., supported object 1 is implemented based on supported object 2). Similarly, such a dependency direction can be expressed in other suitable manners, without limitation.

In some embodiments, a dependency relationship exists between supported objects corresponding to visualized nodes at adjacent layers. However, a dependency relationship between the supported objects corresponding to visualized nodes that crosses layers (e.g., at different, non-adjacent layers) is avoided such that the representation of an association relationship between the visualized nodes and across layers can be avoided. This way, an association relationship is clearly and directly displayed, avoiding visual ambiguity or confusion caused by representing across non-adjacent layers, thereby facilitating the user to clearly comprehend the dependency relationships between the respective supported objects. For example, for a supported object 1 of the service layer (e.g., corresponding to the "service" dimension), a supported object 2 of the application layer (e.g., corresponding to the "application" dimension), and a supported object 3 of the host layer (e.g., corresponding to the "host" dimension), when supported object 1 depends on supported object 2 and supported object 2 depends on the supported object 3, the respective layers are displayed in the order of "service layer-application layer-host layer" to facilitate the representation of the dependency relationship between supported object 1 and supported object 2 (e.g., by displaying a virtual connecting line between the corresponding visualized node 1 and visualized node 2), and the dependency relationship between supported object 2 and supported object 3 (e.g., by displaying a virtual connecting line between the corresponding visualized node 2 and visualized node 3). However, if the layers are displayed in the order of "application layer-service layer-host layer," the service layer is interposed between visualized node 2 corresponding to supported object 2 and visualized node 3 corresponding to supported object 3, hindering the representation of the association relationship between visualized node 2 and visualized node 3.

In some embodiments, displaying with regard to performance management of the target application is performed at the service, application, and host dimensions. For example, the service layer, the application layer, and the host layer respectively corresponding to the above dimensions are displayed in a stack, in which the service layer is displayed at an upper layer, the application layer at a middle layer, and the host layer in a lower layer. Further, visualized nodes corresponding to respective supported objects at the service dimension are displayed at the service layer, visualized nodes corresponding to respective supported objects at the application dimension are displayed at the application layer, and visualized nodes corresponding to respective supported object at the host dimension are displayed at the host layer. This way, the user comprehends, from software to hardware, as well as from a coarse granularity to a fine granularity, performance statuses of the target application in detail, discovering and solving problems in a timely manner.

In some embodiments, a link representing an association relationship (e.g., an association relationship link) where visualized nodes are positioned is marked. Here, the link includes a number of visualized nodes, and a dependency relationship exists between the supported objects corresponding to the adjacent visualized nodes. In one example, for the service layer, the application layer, and the host layer, it is assumed that the service layer has visualized node 1 corresponding to supported object 1, the application layer has visualized node 2 corresponding to supported object 2, and the host layer has visualized node 3 corresponding to supported object 3. In this example, for visualized node 2, because of a dependency relationship between supported object 1 and supported object 2, there exists an association relationship of "visualized node 1-visualized node 2" between visualized node 1 and visualized node 2. Similarly, because of a dependency relationship between supported object 2 and supported object 3, there exists an association relationship of "visualized node 2-visualized node 3" between visualized node 2 and visualized node 3. Accordingly, the association relationships "visualized node 1-visualized node 2" and "visualized node 2-visualized node 3" form an association relationship link of "visualized node 1-visualized node 2-visualized node 3." Regarding the form of marking the association relationship link, virtual connecting lines can be displayed between the visualized nodes on the link, or the visualized nodes on the link can be highlighted, and so on, without limitation.

In some embodiments, the association relationship link where the visualized nodes are positioned is marked by default such that the user freely views the association relationships among all the visualized nodes. In some embodiments, the user selects one or more visualized nodes and marks the association relationship link(s) where the selected visualized nodes are located such that to avoid visual confusion caused by excessive association relationship links, which leads to inconvenience in the viewing experience of the user.

In some embodiments, when no data flows occur on an association relationship link, static marking is performed on a link segment on the association relationship link. When a data flow occurs on a link segment on the association relationship link, corresponding dynamically-changing marking is performed on the link segment, thereby showing a dynamic flowing of data among various visualized nodes and reflecting the real-time characteristics of the data flow. In some embodiments, since one or more procedures such as acquisition, transmission, processing, and displaying may take time, the dynamically-changing marking of the data flow is often indicative, inherent with differences from the actual data flow in terms of, for example, data flow points of time and data flow rates, to some extent. Nevertheless, the user still is able to comprehend information such as the direction of the data flow, the approximate point of time when the data flow occurred, and so on.

In some embodiments, a link segment on the association relationship link is represented as a connecting line between visualized nodes (e.g., the virtual connecting line above-described). Further, a display attribute of the connecting line corresponding to the link segment is adjusted based on the amount of data flowing between the visualized nodes corresponding to the link segment. This way, the user can determine the amount of data flowing between the visualized nodes corresponding to the connecting link segment by viewing a continuous display attribute. In one example, the display attribute of the connecting line includes one or more of a thickness, a line type (e.g., solid line, dotted line, dashed line, dash-dotted line, etc.), a color, and the like, without limitation.

In some embodiments, a visualized node is used to display the performance status information for a corresponding supported object such that the user comprehends the performance status information of the corresponding supported object by viewing the visualized node and related information thereof. This way, potential problems or faults associated with the supported object are discovered and/or addressed in a timely manner.

In some embodiments, the value of at least one performance status parameter of the corresponding supported object is displayed. Supported objects at different dimensions have different types of performance status parameters.

For example, performance status parameters corresponding to a supported object at the service dimension can include the number of calls, the number of errors reported, the average call duration of time, etc. For another example, performance status parameters corresponding to a supported object at the application dimension can include the number of calls, the number of errors reported, the average call duration of time of a service supported, etc. For still another example, performance status parameters corresponding to a supported object at the host dimension can include a CPU utilization percentage, a memory utilization percentage, disk read and write speeds, a network speed, and the like, without limitation.

In some embodiments, a display attribute of a corresponding visualized node is adjusted based on the value of at least one performance status parameter of a supported object, wherein the value of the display attribute is correlated to the value of the corresponding performance status parameter. Using a supported object of the service dimension as an example, a size of a cross-sectional area of the supported object is positively correlated to the value of the number of calls, a height of the supported object is positively correlated to the average call duration, and a gray value of the color of the supported object is positively correlated to the number of errors reported. Using a supported object of the host dimension as another example, a gray value of the color of the supported object is correlated to the CPU utilization percentage, and a volume of the supported object is correlated to the memory utilization percentage.

In some embodiments, the aforementioned performance status information includes at least one of the latest performance status information, performance status information during a historical time period, and performance status information related to the historical data generated by the target application. In one example, the user configures a historical time period such that the performance status information corresponding to the historical time period is displayed. In another example, the user selects at least part of the historical data generated by the target application such that the performance status information related to the historical data is displayed. In still another example, the latest performance status information is displayed by default, and the latest performance status information can be real-time (e.g., without any intentional delay) or with some delay due to processing.

In some embodiments, the performance status information of the supported objects corresponding to respective visualized nodes is automatically displayed. In some embodiments, selected visualized node(s) is/are determined, then the performance status information of the supported object(s) corresponding to the selected visualized node is displayed. Any suitable techniques can be utilized to allow the user to select visualized nodes. In one example, the user uses a virtual cursor (e.g., a control operated by using a peripheral device such as a mouse) to select a visualized node or increases the scale ratio to a preset ratio such that a visualized node displayed on an interface is determined as being selected, or selects a visualized node by focusing his or line of sight thereon.

In the following, an exemplary "application X" is used to illustrate the technical solutions provided in embodiments of the disclosure.

Figure 3:
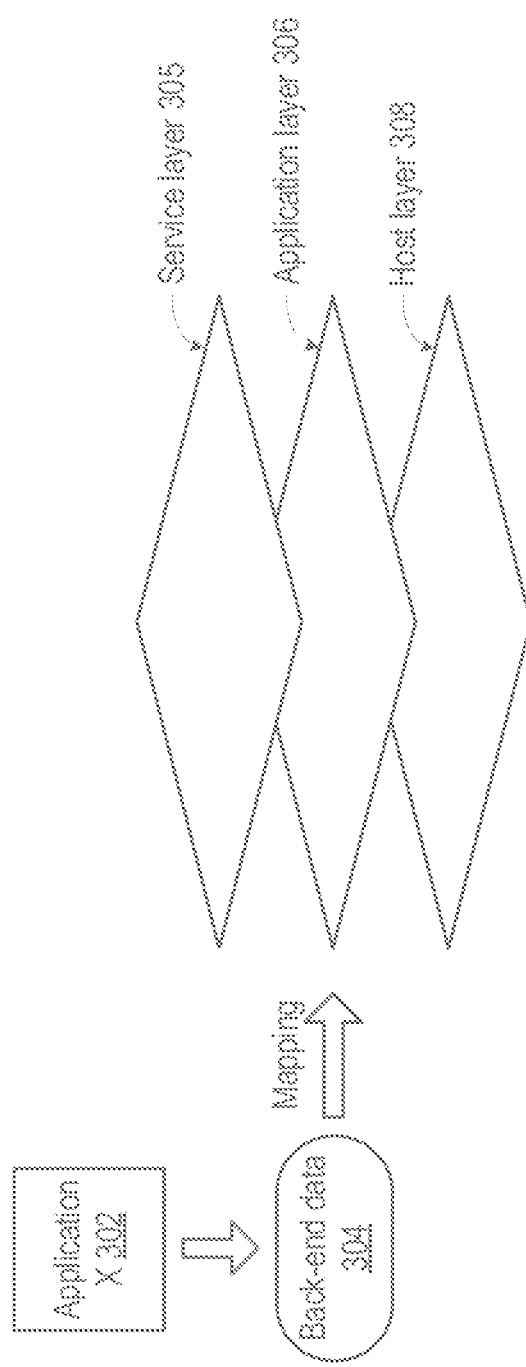
FIG. 3 is a block diagram illustrating a principle for data visualization according to some embodiments of the disclosure.

FIG. 3 is a block diagram illustrating a principle for data visualization according to some embodiments of the disclosure. In some embodiments, and as shown in FIG. 3, back-end data (304) of application X (302) is mapped to layers of a number of dimensions based on its software architectural hierarchy. For example, when the service dimension, the application dimension, and the host dimension are utilized, the back-end data (304) is mapped to a service layer (305), an application layer (306), and a host layer (308), as shown in FIG. 3. This way, the viewing from the perspectives of service, application, and host, is facilitated, respectively.

Figure 4:
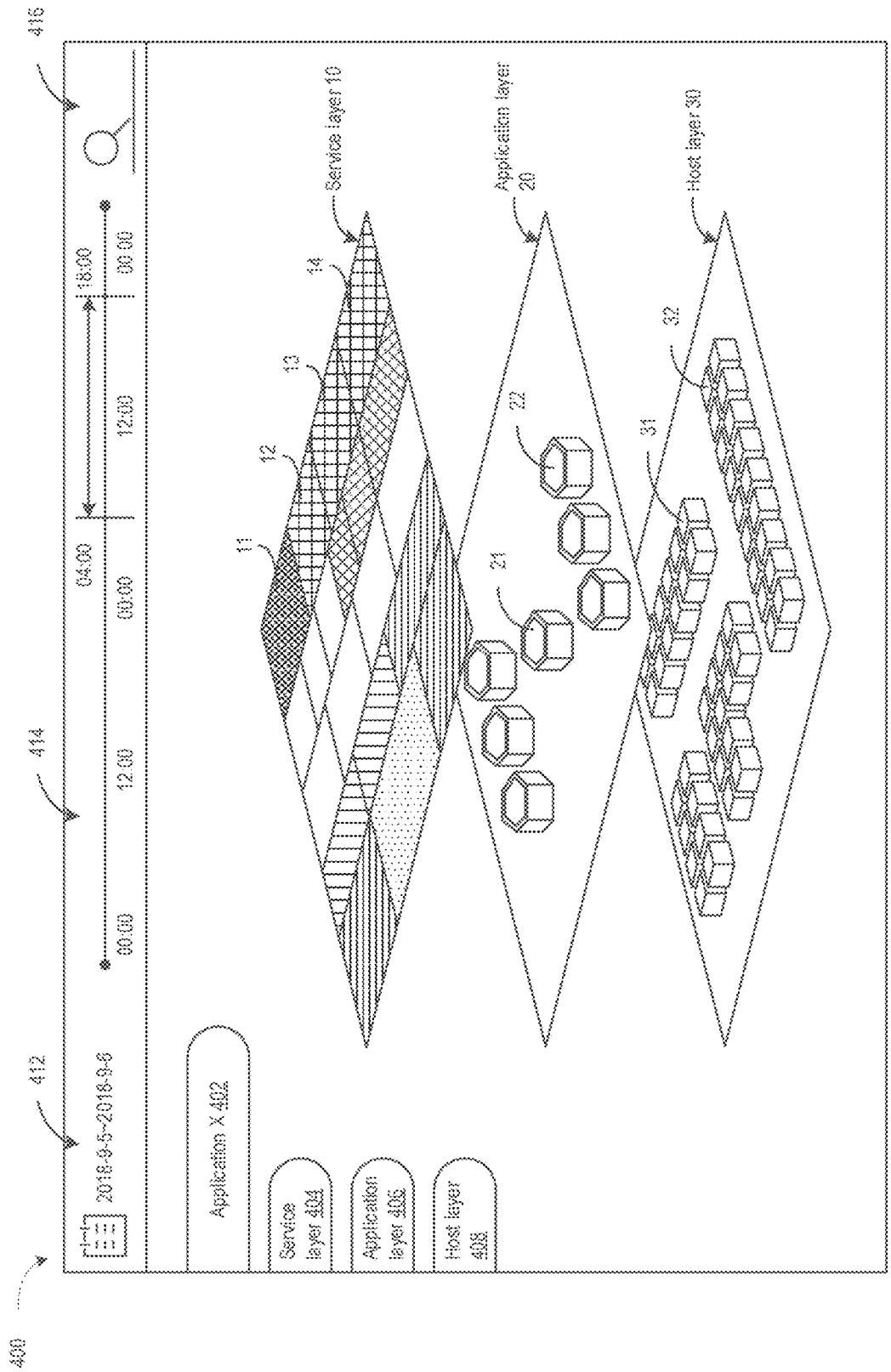
FIG. 4 is a block diagram illustrating an interface for hierarchical data visualization via a three-dimensional form according to some embodiments of the disclosure.

FIG. 4 is a block diagram illustrating an interface for hierarchical data visualization in a three-dimensional form according to some embodiments of the disclosure. In this illustrated embodiment, a user obtains the back-end data of application X via a client running on an electronic device. Based on the processing illustrated in FIG. 3, the back-end data of application X is represented in a three-dimensional form, as shown in FIG. 4. In one example, the three-dimensional display scheme shown in FIG. 4 is implemented using the front-end framework of ThreeJS. Any suitable techniques can be used without limitation.

Still referring to FIG. 4, a displaying interface (400) includes a plurality of regions.

As shown in FIG. 4, in a middle region, three layers corresponding to application X are displayed: a service layer (10), an application layer (20), and a host layer (30). At each layer, visualized nodes corresponding to supported objects of a corresponding dimension are displayed. For example, visualized nodes 11 through 14, and the like, at the service dimension are displayed at the service layer in the form of rectangular blocks, representing the services that application X depends on (e.g., services called by application X). For another example, visualized nodes 21 and 22, and the like, at the application dimension are displayed at the application layer in the form of hexagonal columns, representing the applications that the services (e.g., the services that application X depends on) depend on. For still another example, visualized node 31 and 32, and the like, at the host dimension are displayed at the host layer in the form of cubes, representing the hosts that the applications (e.g., the applications that the services depend on) depend on (e.g., the hosts hosting the corresponding applications).

As shown in FIG. 4, in a left region, a plurality of tabs such as tabs labeled "Application X" (402), "Service Layer" (404), "Application Layer" (406), and "Host Layer" (408) are displayed. In this example, as the tab "Application X" (402) is in a selected state, the middle region displays all the layers corresponding to application X and the visualized nodes thereof, facilitating the user to view from a global perspective. Nevertheless, the user can select another tab such that the middle region is switched to display only a corresponding layer and the visualized nodes thereof. Accordingly, the user can view from a local perspective. For example, when the tab "Service Layer" (404) is selected, the middle region is switched to displaying only the service layer and the visualized nodes 11 through 14, and the like.

As shown in FIG. 4, a top region includes a time period setting option (412) on the left, a timeline (414) in the middle, and an application search option (416) on the right. The time period setting option (412) on the left is operated to configure a time period and obtain back-end data of application X corresponding to the time period such that to display the data at the respective layers in the middle region. A time period can be configured at any granularity, such as "days," "hours," "minutes," "seconds," and the like, without limitation. In the example illustrated in FIG. 4, the time period, configured in the granularity of "days," selects the period of time of "Sep. 5, 2018 to Sep. 6, 2018." Further, in some embodiments, the aforementioned time period is displayed on the timeline (414) in a smaller granularity. For example, and as shown in FIG. 4, the time period is displayed in the granularity of "hours." Further, the user further selects a time period along the timeline (414). For example, in FIG. 4, the selected time period is 04:00 to 18:00 on Sep. 6, 2018, and back-end data corresponding to this selected time period is displayed correspondingly at the respective layers in the middle region. In some embodiments, the user performs a search operation using the application search option (416) on the right such that to select application X, or other application. Afterwards, the back-end data of the selected application is visually displayed. In some embodiments, one or more applications are selected, and the back-end data of the one or more applications are visually displayed on the same interface (e.g., interface (400) as shown in FIG. 4). In various embodiments, the number of selected applications can be any number without limitation.

In some embodiments, with the displaying performed in the three-dimensional form, the user freely adjusts the displaying aspect and scale ratio of each layer displayed in the middle region on the display interface (400) of FIG. 4 to meet the viewing needs of the user. In one example, when particular visualized nodes are blocked when viewed at a certain angle, the displaying aspect can be adjusted to prevent the visualized nodes from being blocked in viewing. In another example, in a small scale ratio, only part of the information of a visualized node is displayed to prevent the accumulation of excessive information from adversely affecting the viewing by the user. In a large scale ratio, the information displayed is appropriately increased such that, for example, the name and other information associated with a supported object corresponding to the visualized node, is not displayed when the scale ratio is small, and is displayed when the scale ratio is large.

Using the dimensions of service, application, and host as an example, there are dependency relationships between the objects supported by application X at corresponding service, application, and host dimensions. For example, services depend on applications, and the applications depend on hosts. Accordingly, based on the above-described dependency relationships, there exist corresponding association relationships between the visualized nodes displayed at the service layer, the application layer, and the host layer. When each layer includes a large number of visualized nodes, association relationship links formed based on the association relationships are displayed, facilitating the comprehension of the association relationships between the respective visualized nodes to determine the dependency relationships between corresponding supported objects.

Figure 5:
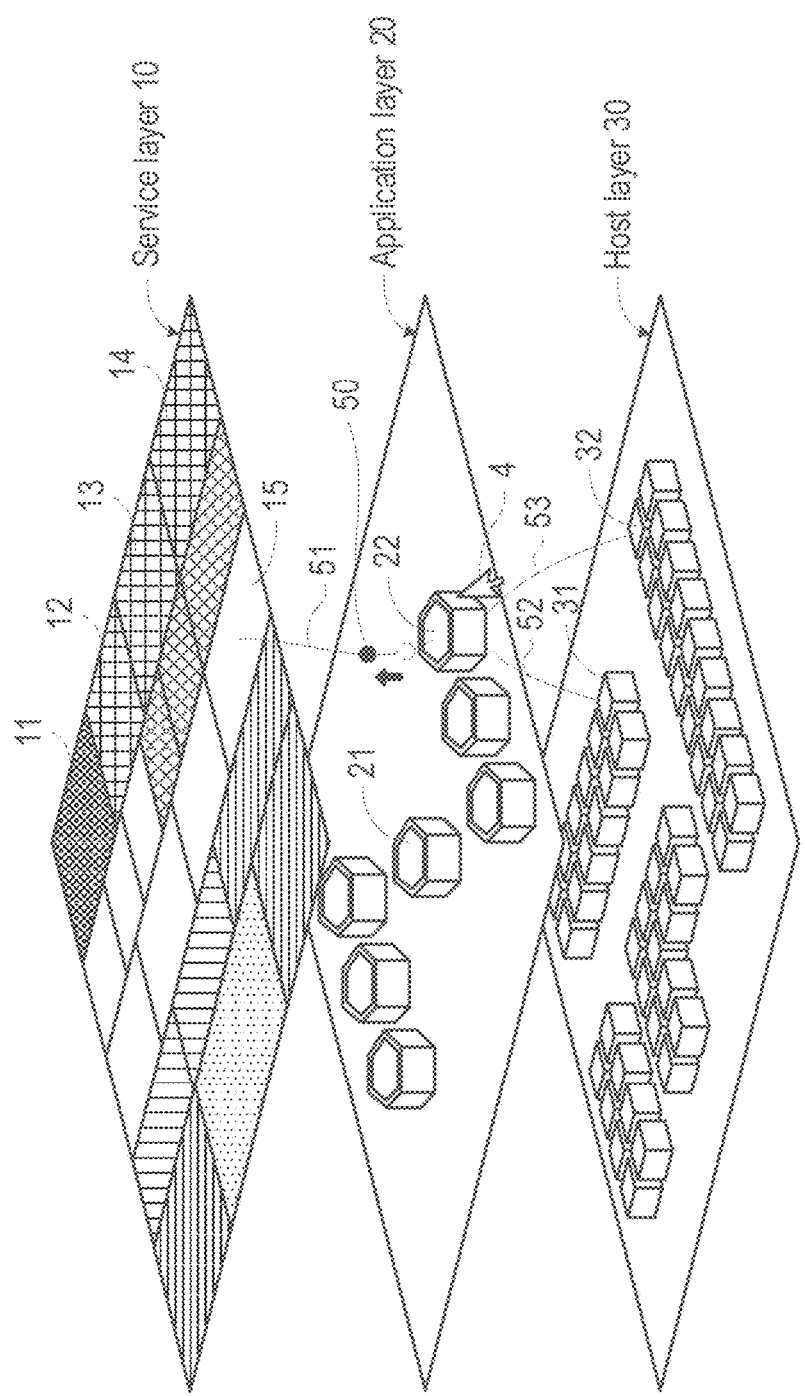
FIG. 5 is a block diagram illustrating the display of an association relationship link according to some embodiments of the disclosure.

FIG. 5 is a block diagram illustrating displaying an association relationship link according to some embodiments of the disclosure. In some embodiments, and as shown in FIG. 5, when the user selects visualized node (22) at the application layer (20) using a cursor (4), it is assumed that it is determined, based on the dependency relationships, that the visualized node (22) has an association relationship 1 with the visualized node (15) of the service layer, an association relationship 2 with the visualized node (31) of the host layer, and an association relationship 3 with the visualized node (32) of the host layer. As such, the association relationship 1 is represented as a connecting line (51) as shown in FIG. 5, the association relationship 2 is represented as a connecting line (52) as shown in FIG. 5, and the association relationship 3 is represented as a connecting line (53) as shown in FIG. 5. This way, a corresponding association relationship link of "visualized node 15-visualized node 22-visualized nodes 31 and 32" is formed. The association relationship link includes an association relationship link segment 1 corresponding to the connecting line (51), an association relationship link segment 2 corresponding to the connecting line (52), and an association relationship link segment 3 corresponding to the connecting line (53).

In some embodiments, when displaying the above-described association relationship link, the visualized node (15), the visualized node (22), and the visualized nodes (31 and 32) on the association relationship link are labeled, for example, with the information of the corresponding supported objects (e.g., the name of a service or an application, an IP address of a host, etc.). This way, the user comprehends the supported objects corresponding to the respective visualized nodes, thereby mapping each of the association relationships along the association relationship link to the dependency relationships between the corresponding supported objects.

In some embodiments, data flows along the association relationship link are marked. In the example illustrated herein FIG. 5, when a data flow occurs between the visualized node (22) and the visualized node (15), a mark (50) is displayed at the connecting line (51). In one example, the mark (50) is displayed to, starting from the visualized node (22), move along the line (51) to the visualized node (15), indicating that data has flowed from the visualized node (22) to the visualized node (15). In various embodiments, the mark (50) can implemented in any suitable form such as a ball or a lighted spot, without limitation. Further, in addition to the mark (50), a data flow can be represented in any other suitable manners, also without limitation.

Figure 6:
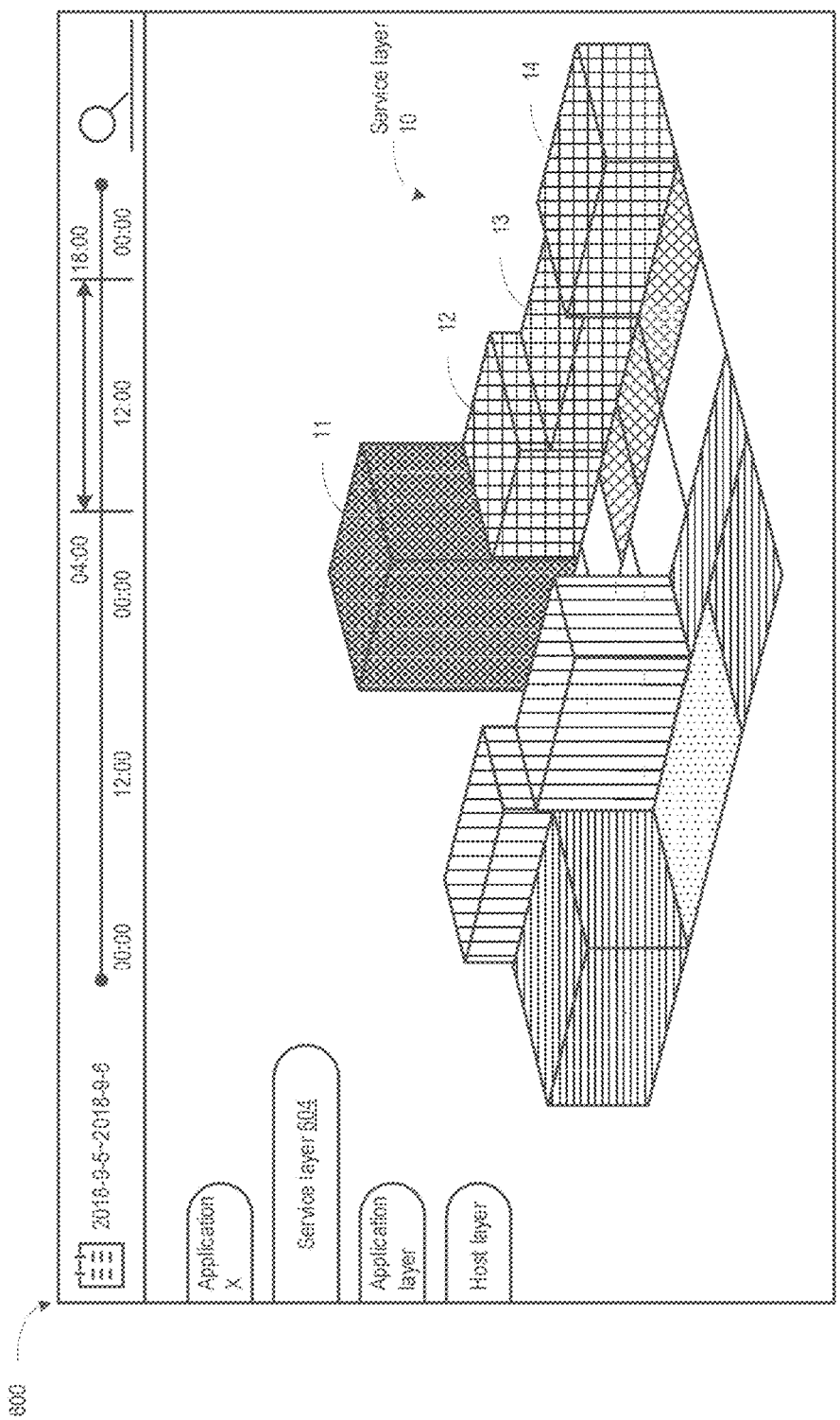
FIG. 6 is a block diagram illustrating an interface for displaying a service layer according to some embodiments of the disclosure.

FIG. 6 is a block diagram illustrating displaying a service layer according to some embodiments of the disclosure. In some embodiment, and as shown in FIG. 6, when a "Service Layer" tab (604) on the left of an interface (600) is selected, the displaying of the global content shown in FIG. 4 is switched to displaying only content related to the service layer (10). This way, t the user easily views the content in detail. In this example, supported objects corresponding to visualized nodes at the service layer (10) are services called by application X; and the performance status information of the services is displayed in FIG. 6.

In some embodiments, when a particular visualized node is selected, the information such as the name of a service corresponding to the selected visualized node is displayed. In other embodiments, such information is displayed continuously without a selection of the visualized node.

In some embodiments, a display attribute of a visualized node is set to reflect the performance status information of a corresponding service. In this example shown in FIG. 6, a plane at which e the service layer is positioned is divided into a number of rectangular blocks. Each rectangular block is a visualized node and corresponds to a corresponding service. The size of an area of the rectangular block is used to represent the number of times the corresponding service is called (QPS). Here, for example, the area occupied by the visualized node (11) is larger and the area occupied by the visualized node (12) is smaller, indicating that the service corresponding to the visualized node 11 is called more times than the service corresponding to the visualized node (12) is called. Further, the color of the rectangular block is used to represent the number of reported errors of the corresponding service. For example, the color of the visualized node (11) is dark red, indicating that the number of errors exceeds a first threshold; while the color of the visualized nodes (12 through 14) is light red, indicating that the number of errors exceeds a second threshold but has not yet reached the first threshold. Further, since displaying is performed in the three-dimensional form, a height is further be used as a display attribute of a visualized node. For example, by adding a height attribute to each rectangular block in FIG. 6, the height of the rectangular block is used to positively correlate to the average call duration of a corresponding service.

In some embodiments, in addition to providing to the user a relative performance status, the display attribute also displays the values of various performance status parameters with respect to the services corresponding to respective visualized nodes. For example, when the user selects the visualized node (11), the values of the performance status parameters, such as the number of times a service corresponding to the visualized node (11) is called, the number of errors, and the average call duration, are accordingly displayed.

Figure 7:
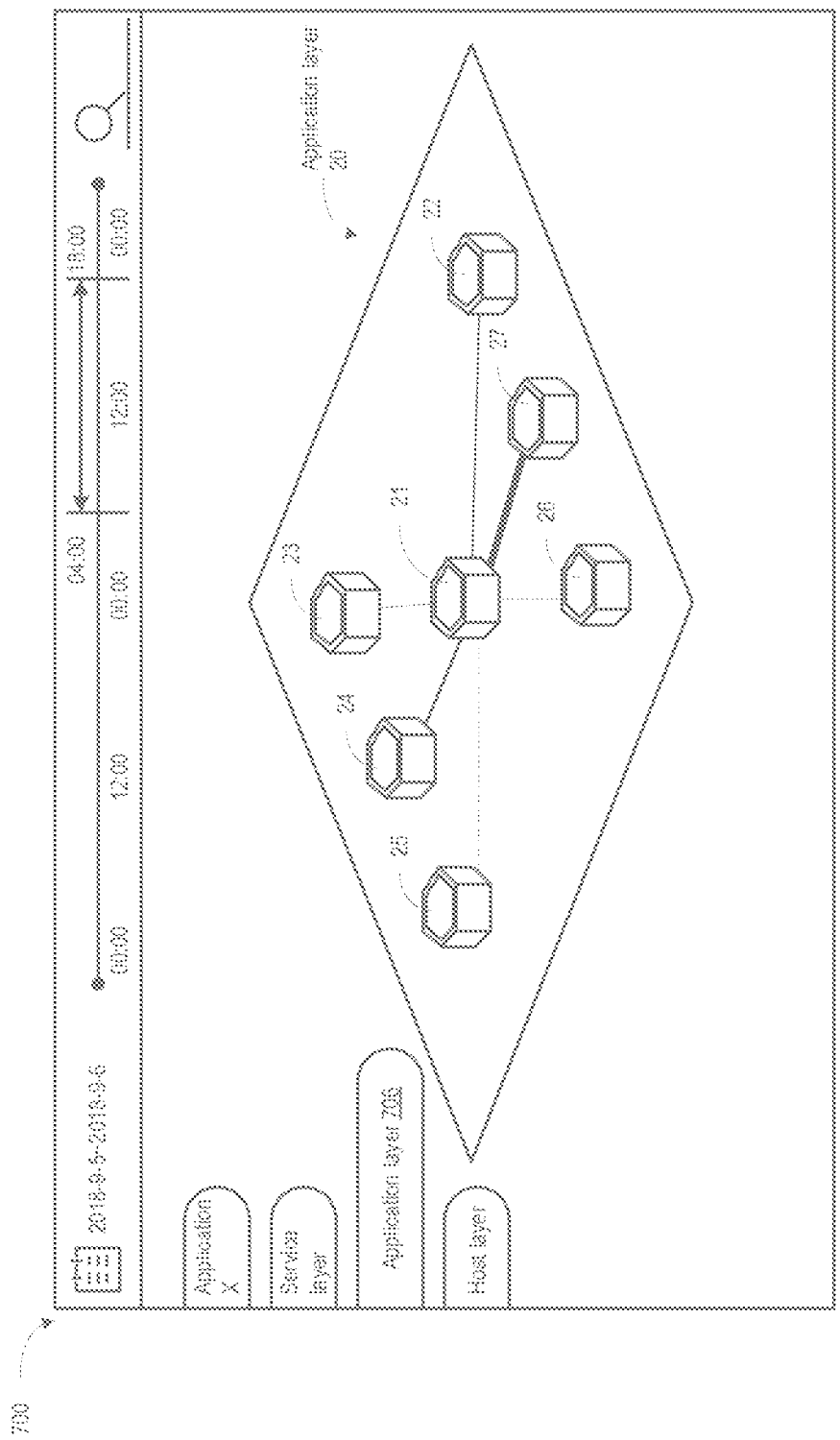
FIG. 7 is a block diagram illustrating an interface for displaying an application layer according to some embodiments of the disclosure.

FIG. 7 is a block diagram illustrating displaying an application layer according to some embodiments of the disclosure. In some embodiments and as shown in FIG. 7, when an "Application Layer" tab (706) on the left of an interface (700) is selected, the displaying of the global content as shown in FIG. 4 is switched to displaying only content related to the application layer (20). This way, the user easily views the content in detail. In this example, corresponding to the services called by application X, the supported objects corresponding to visualized nodes at the application layer are applications called by the services (e.g., equivalent to applications other than application X).

In the embodiment illustrated herein, the visualized nodes (22 through 27) shown in FIG. 7 correspond to various applications that are called by the services. In various embodiments, the applications include any types of application, for example, universal middleware applications, non-universal applications related to service scenarios, without limitation.

In some embodiments, when a particular visualized node is selected, the information, such as the name of an application corresponding to the selected visualized node, is displayed. In other embodiment, such information is displayed continuously without a selection of the visualized node.

In some embodiments, to display the amount of data called of each application, the visualized node (21) corresponding to application X is displayed in FIG. 7, and a connecting line is displayed between the visualized node (21) and the visualized nodes (22 through 27) such that to indicate a status of a data flow between application X and various other applications, via application X calling related services. When the amount of data called of the application corresponding to the visualized node (27) is relatively large, a relatively thick solid line is used between the visualized node (21) and the visualized node (27). When the amount of data called of the application corresponding to the visualized node (24) is relatively small, a relatively thin solid line is used between the visualized node (21) and the visualized node (24). When the amount of data called of the applications corresponding to the visualized nodes (22 and 23) is relatively smaller, a relatively thinner solid line is used between the visualized node 21 and the visualized nodes (22 and 23), respectively. When the amount of data called of the applications corresponding to the visualized nodes (25 and 26) is even smaller, a dotted line is used between the visualized node (21) and the visualized nodes (25 and 26).

In some embodiments, when the user selects a particular visualized node, for example, when the visualized node (22) is selected, assuming that the application corresponding to the visualized node (22) is called by the service corresponding to the visualized node (15) (e.g., the visualized node (15) of FIG. 5), the values of the performance status parameters such as the number of calls, the number of errors, and the average call duration associated with the service corresponding to the visualized node (15) are displayed accordingly.

Figure 8:
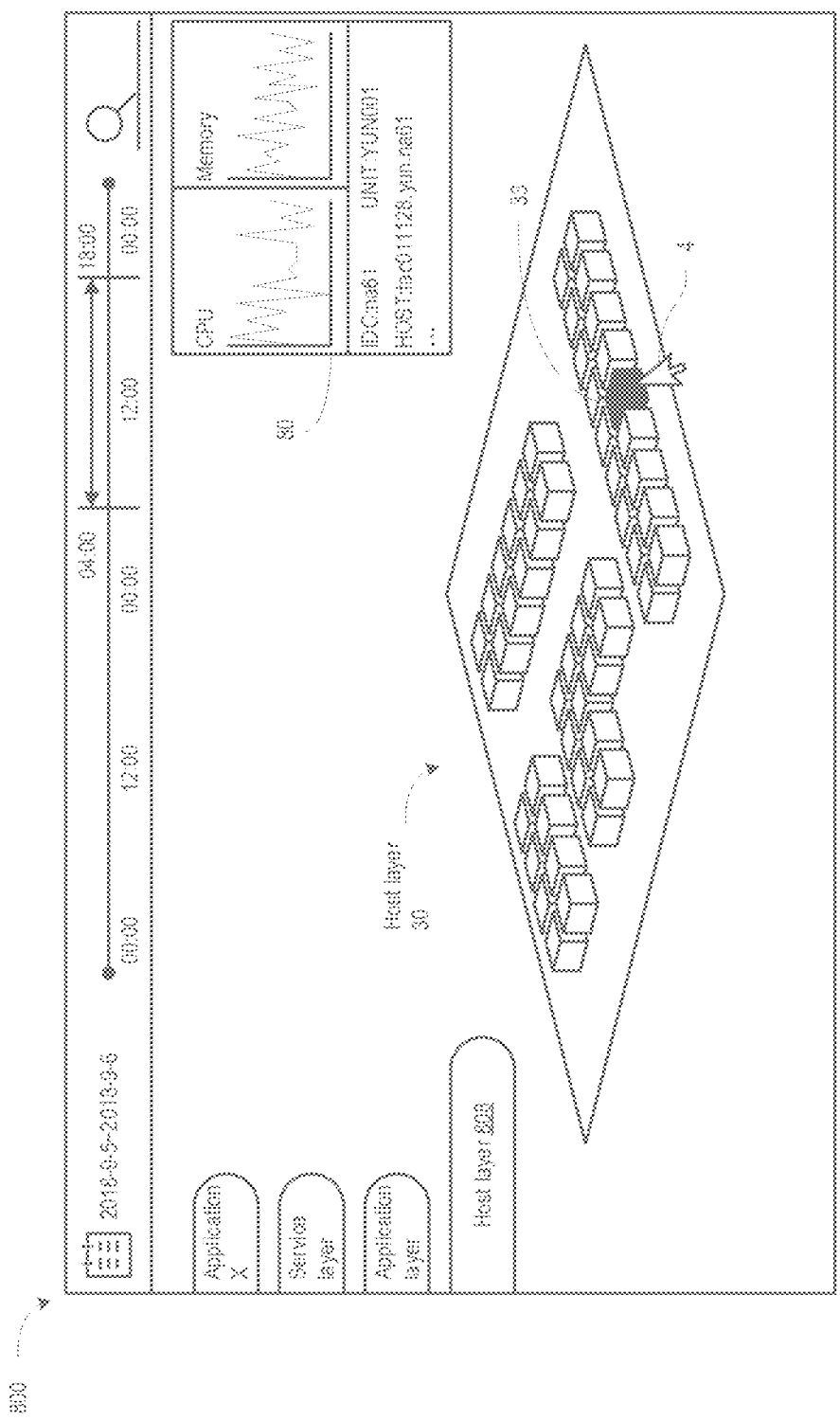
FIG. 8 is a block diagram illustrating an interface for displaying a host layer according to some embodiments of the disclosure.

FIG. 8 is a block diagram illustrating displaying a host layer according to some embodiments of the disclosure. In some embodiments, and as shown in FIG. 8, when a "Host Layer" tab (808) on the left of an interface (800) is selected, the displaying of the global content as shown in FIG. 4 is switched to displaying only content related to the host layer (30). This way, the user easily views the content in detail. In this example, corresponding to the services called by application X, and the other applications called by the services, the supported objects corresponding to visualized nodes at the host layer are hosts that host these other applications.

In some embodiment, the color or other display attributes of each visualized node is set to indicate an overall performance status of a corresponding host. For example, when the overall performance status of the host is good, the color is set to white; when the overall performance status of the host is poor, the color is set to light red; and when the overall performance status of the host is extremely poor, the color is set to dark red.

In some embodiments, when the user selects a particular visualized node (33) by controlling the cursor (4), a window (80) is displayed on the interface (800). In window (80), curves reflecting the changes in the values of performance status parameters, such as a CPU utilization percentage and a memory utilization percentage of the corresponding host are shown. In various embodiments, in addition to a CPU utilization percentage and a memory utilization percentage, curves of the values or value changes associated with other performance status parameters can also be displayed, without limitation.

In some embodiments, in addition to the performance status parameters, the window (80) is also configured to display other information of the corresponding host, such as the information of a computer room (IDC), unit (UNIT), and physical device (HOST), without limitation.

Figure 9:
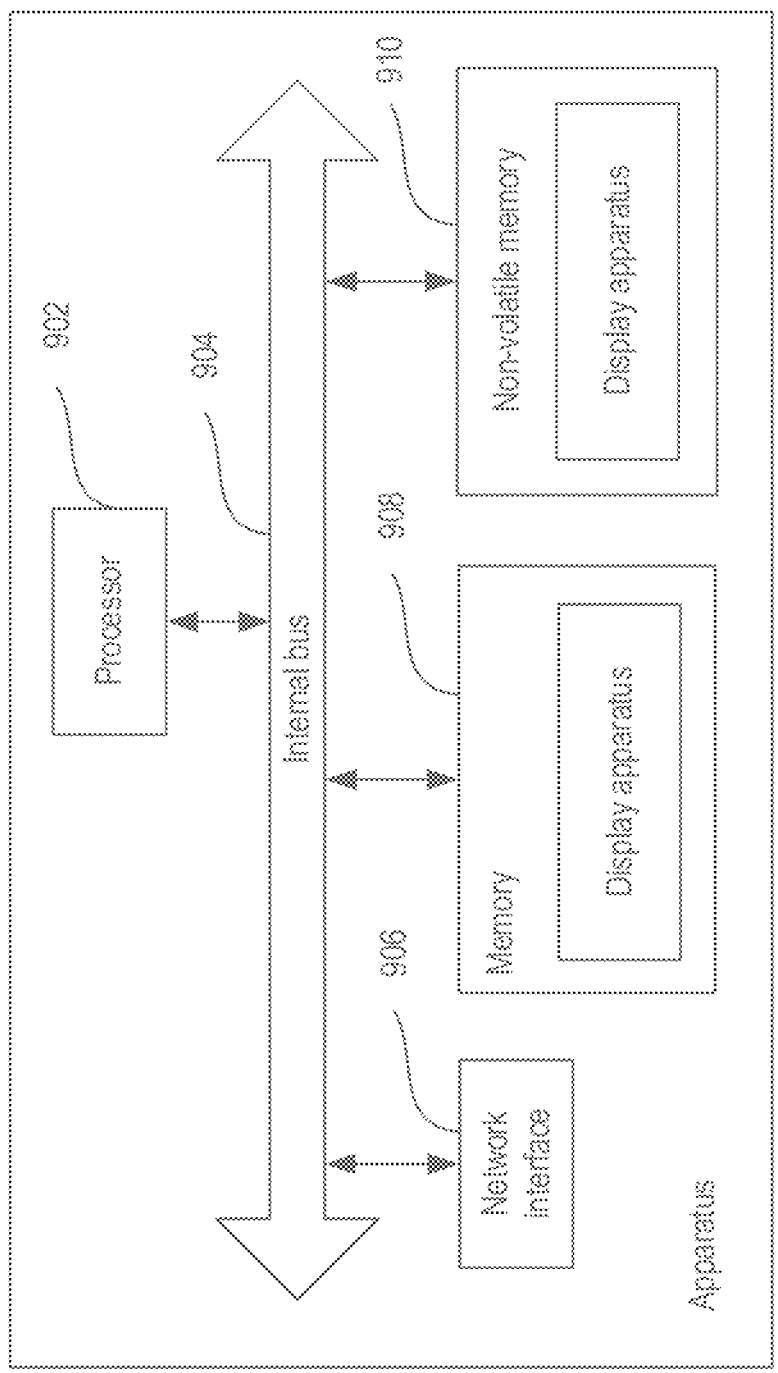
FIG. 9 is a block diagram illustrating a device according to some embodiments of the disclosure.

FIG. 9 is a block diagram illustrating a device according to some embodiments of the disclosure. In some embodiments, and as shown in FIG. 9, the device includes a processor (902), an internal bus (904), a network interface (906), a memory (908), and a non-volatile memory (910). In various embodiments, the device can further include any other hardware required for services. The processor (902) is configured to read a corresponding computer program from the non-volatile memory (910) to the memory (908) for execution, which implements a displaying apparatus for application performance management at a logical level. Further, in addition to the software implementation, embodiments of the disclosure include other implementations such as using a logical device or a combination of software and hardware. In other words, execution entities of the following processing flows are not limited to logical units, rather including hardware and/or logical devices.

Figure 10:
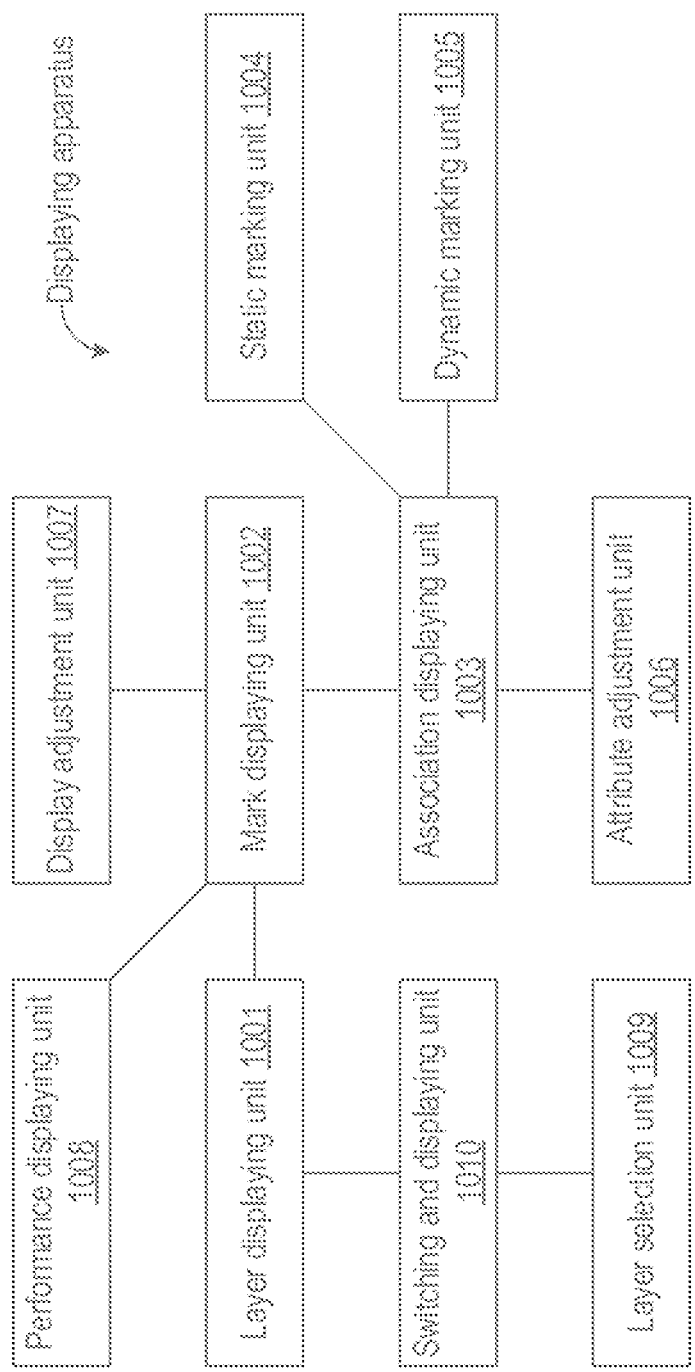
FIG. 10 is a block diagram illustrating a displaying apparatus for application performance management according to some embodiments of the disclosure.

FIG. 10 is a block diagram illustrating an apparatus according to some embodiments of the disclosure. In some embodiments, and as shown in FIG. 10, a displaying apparatus for application performance management, implemented in software, includes a layer displaying unit (1001), and a mark displaying unit (1002).

The layer displaying unit (1001) is configured for displaying a layer corresponding to a dimension.

The mark displaying unit (1002) is configured for displaying a visualized node corresponding to an object supported by a target application at a corresponding layer based on a dimension to which the supported object belongs.

In some embodiments, the apparatus further includes an association displaying unit (1003), configured for displaying corresponding visualized nodes in an associative manner based on a dependency relationship between supported objects at different dimensions.

In some embodiments, the dimensions include a service dimension, an application dimension, and a host dimension, each respectively corresponding to a service layer, an application layer, and a host layer. In some embodiments, the association displaying unit (1003) is further configured for displaying the service layer at an upper layer, displaying the application layer at a middle layer, and displaying the host layer at a lower layer; and displaying at the service layer a visualized node corresponding to a supported object at the service dimension, displaying at the application layer a visualized node corresponding to a supported object at the application dimension, and displaying at the host layer a visualized node corresponding to a supported object at the host dimension.

In some embodiments, the dependency relationship is present between the supported objects corresponding to the visualized nodes of adjacent layers.

In some embodiments, the association displaying unit (1003) is further configured for: marking an association relationship link where visualized nodes are positioned, wherein the association relationship link includes a number of visualized nodes, and a dependency relationship exists between the supported objects corresponding to adjacent visualized nodes.

In some embodiments, the apparatus further includes a static marking unit (1004) and a dynamic marking unit (1005). The static marking unit (1004) is configured for performing static marking on a link segment of an association relationship link when no data flows occur on the association relationship link. The dynamic marking unit (1005) is configured for performing corresponding dynamically-changing marking on a link segment of an association relationship link when a data flow occurs on the link segment.

In some embodiments, a link segment of an association relationship link is represented as a connecting line between visualized nodes. In this case, the apparatus further includes an attribute adjustment unit (1006) configured for adjusting, based on the amount of data flowing between the visualized nodes corresponding to the link segment, a display attribute of the connecting line corresponding to the link segment.

In some embodiments, the layer and the visualized node are displayed in a three-dimensional form. In this case, the apparatus further includes a display adjustment unit (1007) configured for adjusting at least one of a display aspect and a scale ratio of the layer and the visualized node based on a received adjustment instruction.

In some embodiments, the dimension includes at least one of a request, an action, a service, an application, a process, a virtual machine, a container, and a host.

In some embodiments, the apparatus further includes a performance displaying unit (1008) configured for displaying performance status information of the corresponding supported object via the visualized node.

In some embodiments, the performance displaying unit (1008) is configured for implementing at least one of displaying the value of at least one performance status parameter of the corresponding supported object; and adjusting a display attribute of the visualized node, the value of the display attribute correlated to the value of the corresponding performance status parameter.

In some embodiments, the performance status information includes at least one of the latest performance status information, the performance status information during a historical period of time, and the performance status information related to historical data generated by the target application.

In some embodiments, the performance displaying unit (1008) is configured for: determining a selected visualized node and displaying the performance status information of a supported object corresponding to the selected visualized node.

In some embodiments, the apparatus further includes a layer selection unit (1009) and a switching and displaying unit (1010). The layer selection unit (1009) is configured for determining a selected layer. The switching and displaying unit (1010) is configured for switching to displaying the selected layer and a visualized node contained therein.

The system, apparatus, module, or unit illustrated in the aforementioned embodiments may be specifically implemented by a computer chip or an entity, or a product having a certain function. A typical implementation device is a computer, and the specific form of the computer may be a personal computer, a laptop computer, a cell phone, a camera phone, a smartphone, a personal digital assistant, a media player, a navigation device, an email transmission and reception device, a game console, a tablet computer, a wearable device, or a combination of any of these devices.

In a typical configuration, the computer includes one or a plurality of processors (CPUs), input/output interfaces, network interfaces, and memories.

The memory may include a computer-readable medium in the form of a non-permanent memory, a Random Access Memory (RAM) and/or non-volatile memory or the like, such as a Read-Only Memory (ROM) or a flash memory (flash RAM). The memory is an example of the computer-readable medium.

The computer-readable medium includes permanent and non-permanent, movable and non-movable media that can achieve information storage by means of any methods or techniques. The information may be a computer-readable instruction, a data structure, a module of a program, or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a disk storage, a quantum memory, a graphene-based storage medium, or other magnetic storage devices, or any other non-transmission medium, and can be used to store information accessible by a computing device. Based on the definitions herein, the computer-readable medium does not include transitory computer-readable media (transitory media), such as a modulated data signal and a carrier wave.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

The specific embodiments of the disclosure have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The terms used in one or a plurality of embodiments of the disclosure are only for the purpose of describing particular embodiments, and are not intended to limit the one or a plurality of embodiments of the disclosure. The singular forms "a," "said," and "the" used in one or more embodiments of the disclosure and in the appended claims are also intended to include plural forms, unless the context clearly indicates otherwise. It should also be understood that the term "and/or" used herein refers to and includes any or all possible combinations of one or a plurality of associated listed items.

It should be understood that although terms such as first, second, and third may be used to describe various types of information in one or a plurality of embodiments of the disclosure, such information should not be limited to these terms. These terms are only used to distinguish one type of information from another type of information. For example, first information may also be referred to as second information, and similarly, second information may also be referred to as first information without departing from the scope of one or a plurality of embodiments of the disclosure. Depending on the context, the word "if" as used herein may be construed to mean "when . . . " or "upon . . . " or "in response to determining."

The above descriptions are merely preferred embodiments of one or a plurality of embodiments of the disclosure and are not intended to limit one or a plurality of embodiments of the disclosure. Any modification, equivalent replacement, or improvement made without departing from the spirit and principle of one or a plurality of embodiments of the disclosure should fall within the protection scope of one or a plurality of embodiments of the disclosure.

The invention claimed is:

1. A method comprising:
 obtaining, by a processor, data from a target application, the data collected by the target application while executing on a computing device;
 mapping, by the processor, the data into a plurality of dimensions based on a software architectural hierarchy of the data of the target application, the plurality of dimensions comprising a service dimension representing services called by the target application, an application dimension representing services the target application depends on, and a host dimension representing host devices that the target application depends on;
 displaying, by the processor, a plurality of layers corresponding to the plurality of dimensions, wherein each layer in the plurality of layers is displayed in a corresponding display plane of a set of display planes, the set of display planes arranged as a three-dimensional stack;
 displaying, by the processor and based on a dimension associated with an object supported by the target application, a visualized node corresponding to the object at a corresponding layer of the plurality of layers, wherein the visualized node comprises a three-dimensional form situated on a display pane corresponding to the corresponding layer of the plurality of layers;
 displaying, by the processor and based on a dependency relationship identified between supported objects at different dimensions of the plurality of dimensions, visualized nodes corresponding to the supported objects and at least one link between two visualized nodes in an associative manner; and
 dynamically, by the processor, changing an appearance of the at least one link based on changes in the data between the two visualized nodes.

2. The method of claim 1, the plurality of dimensions comprising a service dimension, an application dimension, and a host dimension, each of the plurality of dimensions corresponding to a service layer, an application layer, and a host layer, respectively; and the displaying visualized nodes corresponding to the supported objects in an associative manner comprises:
 displaying the service layer at an upper layer;
 displaying the application layer at a middle layer;
 displaying the host layer at a lower layer;
 displaying at the service layer a visualized node corresponding to a supported object at the service dimension;
 displaying at the application layer a visualized node corresponding to a supported object at the application dimension; and
 displaying at the host layer a visualized node corresponding to a supported object at the host dimension.

3. The method of claim 1, the supported objects corresponding to visualized nodes of adjacent layers of the plurality of layers having the dependency relationship.

4. The method of claim 1, the displaying visualized nodes corresponding to the supported objects in an associative manner comprising:
 marking an association relationship link where visualized nodes are positioned, the association relationship link comprising a plurality of visualized nodes, and supported objects corresponding to adjacent visualized nodes having a dependency relationship.

5. The method of claim 4, further comprising:
 performing static marking on a link segment on the association relationship link when no data flows occur on the association relationship link; and
 performing corresponding dynamically-changing marking on a link segment on the association relationship link when a data flow occurs on the link segment.

6. The method of claim 4, a link segment on the association relationship link represented as a connecting line between the visualized nodes; and the method further comprising:
 adjusting, based on an amount of data flowing between the visualized nodes corresponding to the link segment, a display attribute of the connecting line corresponding to the link segment.

7. The method of claim 1, the plurality of layers and the visualized node displayed in a three-dimensional form.

8. The method of claim 7, further comprising:
 adjusting, based on a received adjustment instruction, at least one of a display aspect and a scale ratio associated with one or both of a layer of the plurality of layers and the visualized node.

9. The method of claim 1, the plurality of dimensions comprising at least one of a dimension of a request, an action, a service, an application, a process, a virtual machine, a container, and a host.

10. The method of claim 1, further comprising:
displaying, via the visualized node, performance status information of the corresponding supported object.

11. The method of claim 10, the displaying performance status information of the corresponding supported object comprising at least one of:
displaying a value of at least one performance status parameter of the corresponding supported object; and
adjusting a display attribute of the visualized node, a value of the display attribute correlated to the value of the corresponding performance status parameter.

12. The method of claim 10, the performance status information comprising at least one of: latest performance status information, performance status information in a historical period of time, and performance status information related to historical data generated by the target application.

13. An apparatus comprising:
a processor; and
a storage medium for tangibly storing thereon program logic for execution by the processor, the stored program logic comprising:
logic, executed by the processor, for obtaining data from a target application, the data collected by the target application while executing on a computing device,
logic, executed by the processor, for mapping the data into a plurality of dimensions based on a software architectural hierarchy of the data of the target application, the plurality of dimensions comprising a service dimension representing services called by the target application, an application dimension representing services the target application depends on, and a host dimension representing host devices that the target application depends on,
logic, executed by the processor, for displaying a plurality of layers corresponding to the plurality of dimensions, wherein each layer in the plurality of layers is displayed in a corresponding display plane of a set of display planes, the set of display planes arranged as a three-dimensional stack,
logic, executed by the processor, for displaying, based on a dimension associated with an object supported by the target application, a visualized node corresponding to the object at a corresponding layer of the plurality of layers, wherein the visualized node comprises a three-dimensional form situated on a display pane corresponding to the corresponding layer of the plurality of layers,
displaying, based on a dependency relationship identified between supported objects at different dimensions of the plurality of dimensions, visualized nodes corresponding to the supported objects and at least one link between two visualized nodes in an associative manner, and
dynamically changing an appearance of the at least one link based on changes in the data between the two visualized nodes.

14. The apparatus of claim 13, the plurality of dimensions comprising:
a service dimension, an application dimension, and a host dimension, each of the plurality of dimensions corresponding to a service layer, an application layer, and a host layer, respectively; and
the logic for displaying visualized nodes corresponding to the supported objects in an associative manner comprises:

logic, executed by the processor, for displaying the service layer at an upper layer,
logic, executed by the processor, for displaying the application layer at a middle layer,
logic, executed by the processor, for displaying the host layer at a lower layer,
logic, executed by the processor, for displaying at the service layer a visualized node corresponding to a supported object at the service dimension,
logic, executed by the processor, for displaying at the application layer a visualized node corresponding to a supported object at the application dimension, and
logic, executed by the processor, for displaying at the host layer a visualized node corresponding to a supported object at the host dimension.

15. The apparatus of claim 13, the plurality of layers and the visualized node displayed in a three-dimensional form.

16. A non-transitory computer-readable storage medium for tangibly storing computer program instructions capable of being executed by a computer processor, the computer program instructions defining steps of:
obtaining data from a target application, the data collected by the target application while executing on a computing device;
mapping the data into a plurality of dimensions based on a software architectural hierarchy of the data of the target application, the plurality of dimensions comprising a service dimension representing services called by the target application, an application dimension representing services the target application depends on, and a host dimension representing host devices that the target application depends on;
displaying a plurality of layers corresponding to the plurality of dimensions, wherein each layer in the plurality of layers is displayed in a corresponding display plane of a set of display planes, the set of display planes arranged as a three-dimensional stack;
displaying, based on a dimension associated with an object supported by the target application, a visualized node corresponding to the object at a corresponding layer of the plurality of layers, wherein the visualized node comprises a three-dimensional form situated on a display pane corresponding to the corresponding layer of the plurality of layers;
displaying, based on a dependency relationship identified between supported objects at different dimensions of the plurality of dimensions, visualized nodes corresponding to the supported objects and at least one link between two visualized nodes in an associative manner; and
dynamically, by the processor, changing an appearance of the at least one link based on changes in the data between the two visualized nodes.

17. The non-transitory storage medium of claim 16, the plurality of dimensions comprising: a service dimension, an application dimension, and a host dimension, each of the plurality of dimensions corresponding to a service layer, an application layer, and a host layer, respectively; and the displaying visualized nodes corresponding to the supported objects in an associative manner comprising:
displaying the service layer at an upper layer;
displaying the application layer at a middle layer;
displaying the host layer at a lower layer;
displaying at the service layer a visualized node corresponding to a supported object at the service dimension;

displaying at the application layer a visualized node corresponding to a supported object at f the application dimension; and displaying at the host layer a visualized node corresponding to a supported object at the host dimension.

* * * * *